Jan. 4, 1927.　　　F. W. GAULT, JR　　　1,613,388
GAS MIXER
Filed Oct. 22, 1925
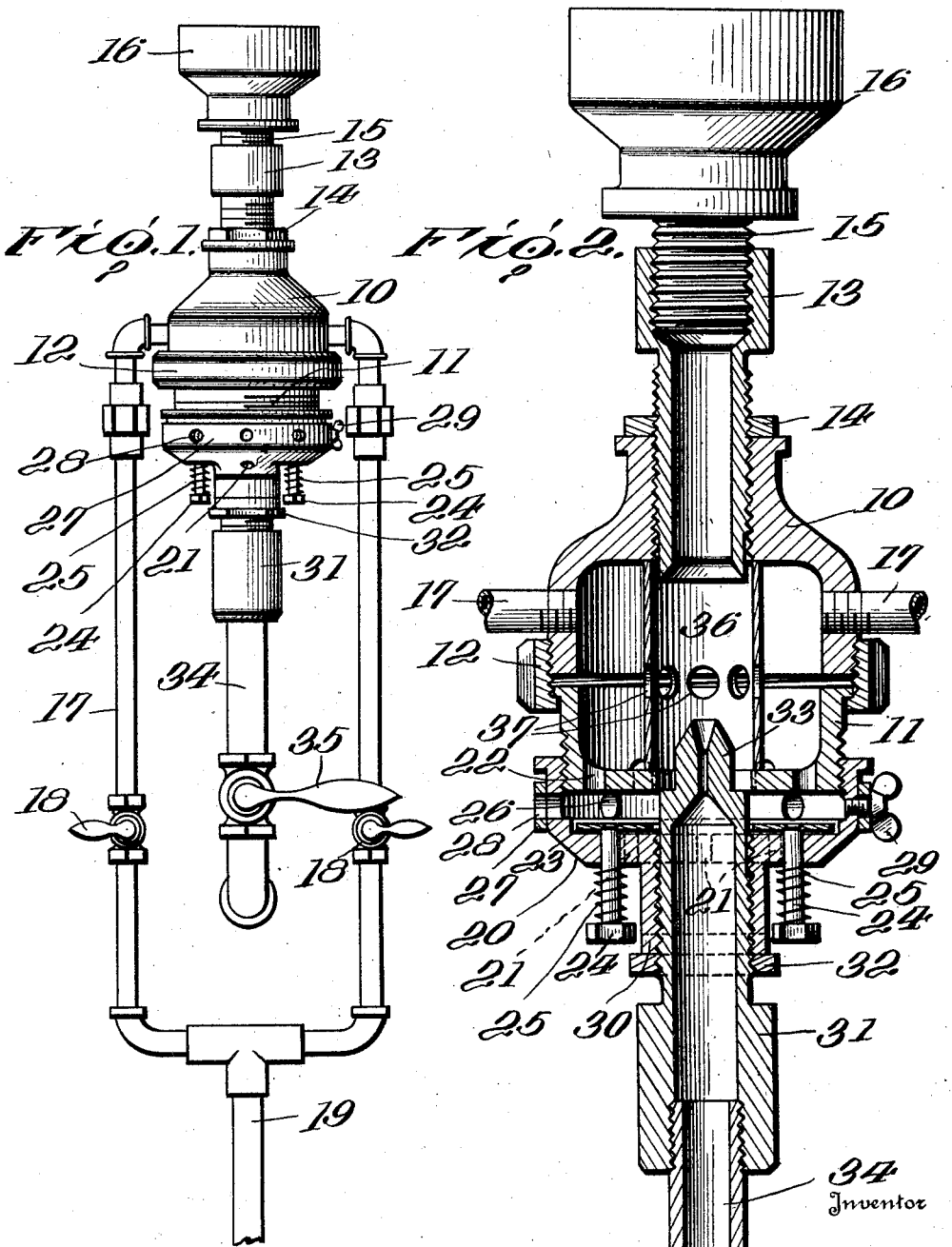
Inventor
Frank W. Gault, Jr.
By Watts T. Estabrook
his Attorney Patented Jan. 4, 1927.

1,613,388

UNITED STATES PATENT OFFICE.

FRANK W. GAULT, JR., OF LOUISVILLE, KENTUCKY, ASSIGNOR OF ONE-HALF TO H. J. GREIVE, OF LOUISVILLE, KENTUCKY.

GAS MIXER.

Application filed October 22, 1925. Serial No. 64,181.

This invention relates to an improvement in mixing chambers for gas burners, for use in connection with gas burners for furnaces, heat engines of the rotary and reciprocating types, and similar constructions wherein gas burners are employed for heating purposes.

This invention consists of a mixing chamber made in sections and provided with a removable centrally located perforated tube. A compressed air nozzle is connected to the mixing chamber and delivers compressed air through the tubular diaphragm and discharges it to the burner nozzle connected on the opposite side of the chamber, and gas is admitted to the mixing chamber and drawn or sucked into the tubular diaphragm by the compressed air, whereby the gas, and compressed air are mixed together and delivered to the burner nozzles. An automatic control is provided for regulating the amount of atmospheric air delivered to the mixing chamber which is governed in its operation by the amount of compressed air delivered to the mixing chamber.

The invention consists of certain novel features of construction and combination of parts which will be hereinafter described and pointed out in the claims.

In the accompanying drawings:

Figure 1 is a view in side elevation of the invention showing the manner of delivering gas and compressed air to the mixing chamber.

Figure 2 is a vertical sectional view.

The mixing chamber consists of upper and lower sections 10 and 11 connected together by means of a ring 12 loosely mounted upon the lower section 11 and having screw-threaded engagement with the external wall of the upper section 10.

Connected to the upper section 10 and preferably centrally thereof is a nipple 13 which is held in its adjusted position by means of a lock nut 14, the nipple 13, having screw-threaded engagement with section 10. A burner nozzle 15 has screw-threaded connection with the nipple 13, and mounted upon the burner nozzle 15 is a shell 16. Gas is admitted to the mixing chamber through the upper section 10 by means of pipes 17, 17 which are provided with valves 18, 18 for regulating the supply and the pipes 17, 17 are connected to a gas supply pipe 19.

Connected to the lower section 11 is a casing or housing 20 provided with openings 21, 21 in the bottom thereof, for admitting atmospheric air to the mixing chamber through air ports 22, 22 in the bottom of the lower section 11. The air openings 21, 21 of the casing 20 are normally closed by a disk valve 23 mounted in the casing and held over the openings by means of studs 24, 24 connected to the valve and extending through the bottom of the casing. Springs 25 encircle the studs 24 and bear against the heads of the studs 24 and bottom of the casing for normally holding the valve 23 over the openings 21 to prevent the ingress of air to the mixing chamber.

The casing is also provided with a plurality of openings 26 for admitting air to the casing and mixing chamber. The admission of air through the casing and openings 26 is controlled by manually operable ring shaped valve 27 which has ports 28 therein adapted to be brought into registry with openings 26. This valve 27 is held in adjusted position by means of a wing nut 29 which extends through a slot in the ring valve and has screw-threaded engagement with the casing 20.

The air casing 20 is provided with a centrally downwardly extending tubular extension 30 which is internally screw-threaded for engagement with the external screw-threads of the compressed air nozzle 31. The nozzle 31 is adjustably supported in the tubular extension 30 and held in position by a lock nut 32 mounted thereon and adapted to engage the lower end of the tubular extension 30. A central opening 33 is formed in the bottom of the lower section 11 in alinement with the opening in section 10 to which the nipple 13 is connected for the insertion of the air nozzle 31 into and from the mixing chamber of sections 10 and 11.

The compressed air nozzle 31 is connected by a pipe 34 to a compressed air supply. The admission of air through the pipe to the nozzle is controlled by a valve 35.

Mounted within the mixing chamber and between sections 10 and 11 is a tubular diaphragm 36 the bore of which is in alinement with the opening 33 of section 11 and the opening in section 10 for the nipple 13 so that the blast of air from the nozzle 31 will be discharged directly through the mixing chamber and into the nipple 13. The delivery of compressed air through the nozzle 31 to the mixing chamber will draw the gas delivered to the mixing chamber through pipe 17 into tubular diaphragm 36 through ports or holes 37, 37 located in the diaphragm 36 where the gas will be mixed with the compressed air and discharged through the nipple 13 to the burner nozzle 15.

In starting the burner the ring valve 27 will be adjusted for admitting the necessary amount of air of atmosphere to the mixing chamber where it will commingle with the gas delivered thereto by pipe 17 and the air and gas will be drawn into the tubular diaphragm through the ports 37 by the compressed air delivered through the nozzle 31. After the gas has been ignited by this supply of air through the ring valve 27 will be cut off and the amount of atmospheric air delivered to the mixing chamber to commingle with the gas and compressed air will be governed by the suction created by the compressed air delivered to the diaphragm 36. The compressed air will create sufficient suction to draw the gas into the diaphragm and to elevate the disk valve 33 against the tension of the springs 34 to admit the necessary quantity of atmospheric air to the mixing chamber to provide the proper combustion of the gas and create intense heat.

From the foregoing it will be seen that the gas and atmospheric air are drawn into the tubular diaphragm due to the suction created therein by the supply of compressed air which is governed by the valve 35, thereby providing automatic means for regulating the mixture of atmospheric air and gas and compressed air that is to be delivered to the burner.

Having described the invention, what is claimed is:—

1. The combination of a sectional mixing chamber having intake and outlet openings, a tubular perforate diaphragm mounted in the mixing chamber and having the bore thereof in alinement with the intake and outlet openings, means for connecting the sections of the mixing chambers together and holding the diaphragm in position, means for delivering gas to the mixing chamber and a compressed air nozzle supported by the mixing chamber and arranged in alinement with the intake opening for delivering compressed air to the diaphragm.

2. The combination of a mixing chamber having intake and outlet openings, a perforate tubular diaphragm mounted in the mixing chamber and having the bore thereof in alinement with the intake and outlet openings, means for delivering gas to the mixing chamber and a compressed air nozzle supported by the mixing chamber and arranged in alinement with the intake opening for delivering compressed air to the tubular diaphragm, and a burner nozzle connected to the outlet opening of the mixing chamber.

3. The combination of a mixing chamber having intake and outlet openings, a tubular perforate diaphragm located in the mixing chamber, means for delivering gas to the mixing chamber at one side of the diaphragm, means for delivering compressed air to the mixing chamber through the intake opening for drawing the gas through the diaphragm and mixing it with the compressed air and delivering the gas and compressed air through the outlet opening and a burner nozzle connected to the outlet opening of the mixing chamber.

4. The combination of a mixing chamber having intake and outlet openings, a tubular perforate diaphragm located in the mixing chamber, means for delivering gas to the mixing chamber at one side of the diaphragm, means for delivering compressed air to the mixing chamber through the intake opening for drawing the gas through the diaphragm and mixing it with the compressed air and delivering the compressed air and gas through the outlet opening, said mixing chamber having air inlet openings and a valve for controlling the supply of air through said air inlet openings said valve being actuated by the compressed air passing through the mixing chamber.

5. The combination of a mixing chamber having intake and outlet openings, a tubular perforate diaphragm mounted in the mixing chamber and having the bore thereof in alinement with the intake and outlet openings, means for delivering gas to the mixing chamber and a compressed air nozzle supported by the mixing chamber and arranged in alinement with the intake opening for delivering compressed air to the diaphragm, said mixing chamber having air inlet openings and a valve for controlling the supply of air through said air inlet openings said valve being actuated by the compressed air passing through the mixing chamber.

6. The combination of a mixing chamber having intake and outlet openings, means for delivering gas to the mixing chamber, means for delivering compressed air to the mixing chamber through the intake opening, said mixing chamber provided with air inlet ports, a casing mounted on the mixing chamber surrounding the air inlet ports and provided with openings for admitting air into the casing and a spring controlled valve for normally closing the air inlet openings of the casing, said valve adapted to be actuated by the suction of the compressed air passing through the mixing chamber.

FRANK W. GAULT, Jr.